United States Patent [19]
Mulks

[11] Patent Number: 5,721,394
[45] Date of Patent: Feb. 24, 1998

[54] FLUSH MOUNT MULTIPORT CONNECTION BOX

[76] Inventor: Robert Mulks, 120 Asbury Rd., Lansing, N.Y. 14882

[21] Appl. No.: 678,985

[22] Filed: Jul. 12, 1996

[51] Int. Cl.$^6$ .................................................. H02G 3/10
[52] U.S. Cl. ...................... 174/48; 174/58; 220/3.3; 439/535
[58] Field of Search .................... 439/540.1, 531, 439/535; 220/3.3, 3.6; 174/48, 59, 58, 65 R, 65 G, 135

[56] References Cited

U.S. PATENT DOCUMENTS

| | | | |
|---|---|---|---|
| 3,620,404 | 11/1971 | Grasso | 220/18 |
| 3,711,817 | 1/1973 | Carter et al. | 339/121 |
| 3,915,541 | 10/1975 | Flegel | 339/119 R |
| 4,361,372 | 11/1982 | Majkrzak et al. | 339/64 |
| 4,845,316 | 7/1989 | Kaercher | 174/135 |
| 5,066,832 | 11/1991 | Clarey et al. | 174/50 |
| 5,568,362 | 10/1996 | Hansson | 361/736 |

*Primary Examiner*—Kristine L. Kincaid
*Assistant Examiner*—Dhiru R. Patel
*Attorney, Agent, or Firm*—Brown, Pinnisi & Michaels

[57] ABSTRACT

A connection box for communications cabling, especially useful for fiber optic connections, which is capable of being mounted entirely within a standard depth wall or column framing. The box has a depth which is less than the depth of a standard office wall, open to the outside, and with an open bottom (as the box is mounted vertically in the wall). Cables enter the box, either through the open bottom or through a cable fitting, and are attached to a fitting on a removable connector module mounted to the box. A cover can be attached over the open side of the box, flush with the wall, concealing the interconnections.

7 Claims, 1 Drawing Sheet

FLUSH MOUNT MULTIPORT CONNECTION BOX

FIELD OF THE INVENTION

The invention pertains to the field of housings for connection to telecommunications systems. More particularly, the invention pertains to flush-mount housing boxes for telecommunications connectors, especially fiber optic.

BACKGROUND OF THE INVENTION

While at one time office wiring was simple—at most a few electrical outlets and a telephone wire or two—the advent of computer networks, fax machines, electronic telephones, video conferencing, and the like have greatly increased the complexity of the interconnections in modern offices. At the same time, with modular office cubicles, mobile ways, and the like it is becoming more common for offices not to have permanent ways at all. This has complicated the process of arranging the wiring for a modern office.

In a common arrangement, power wiring and communications interconnects are brought down within framed walls or the framing around support columns. The modular cubicle ways, with desks attached, are assembled around these permanent columns. The network and telephone wiring for the cubicles is run through the modular walls, and connected to a junction box on one or more of the columns. Sometimes the network wiring is done as a continuous "home run" from each cubicle, through the modular ways, up the column into the plenum, and then to a network or communications server. In other cases, the junction box contains an array of sockets which are wired to the network wiring, and the cubicle wires are run into the junction box and plugged in to these sockets.

At present, the junction boxes for network wiring, especially the fiber optic cables coming into common use, are mounted on the surface of the wall. The wiring from the server or the like enters the box either from the rear through a hole in the way, or down the column in a "raceway" or "wiremold" conduit. For example, see the Siecor model WCC-048 wall mount cabinet, manufactured by Siecor Corporation of Hickory, N.C. As is typical of the type, that cabinet extends some 3½" out from the wall.

This situation is not desirable for many offices, which would prefer to have the communications interconnections, especially the relatively fragile fiber optic cables, entirely concealed within a wall or column. If an office tends to move the modular dividers frequently, this is especially important, as the office management will not want to leave protruding boxes or large holes on the walls or columns where surface boxes once were.

SUMMARY OF THE INVENTION

The invention comprises a connection box for communications cabling, especially useful for fiber optic connections, which is capable of being mounted entirely within a standard depth wall or column framing. The box has a depth which is less than the depth of a standard office wall, open to the outside, and with an open bottom (as the box is mounted vertically in the wall). Cables enter the box, either through the open bottom or through a cable fitting, and are attached to a fitting on a removable connector module mounted to the box. A cover can be attached over the open side of the box, flush with the wall, concealing the interconnections.

DESCRIPTION OF THE PREFERRED EMBODIMENT

Figure 1:
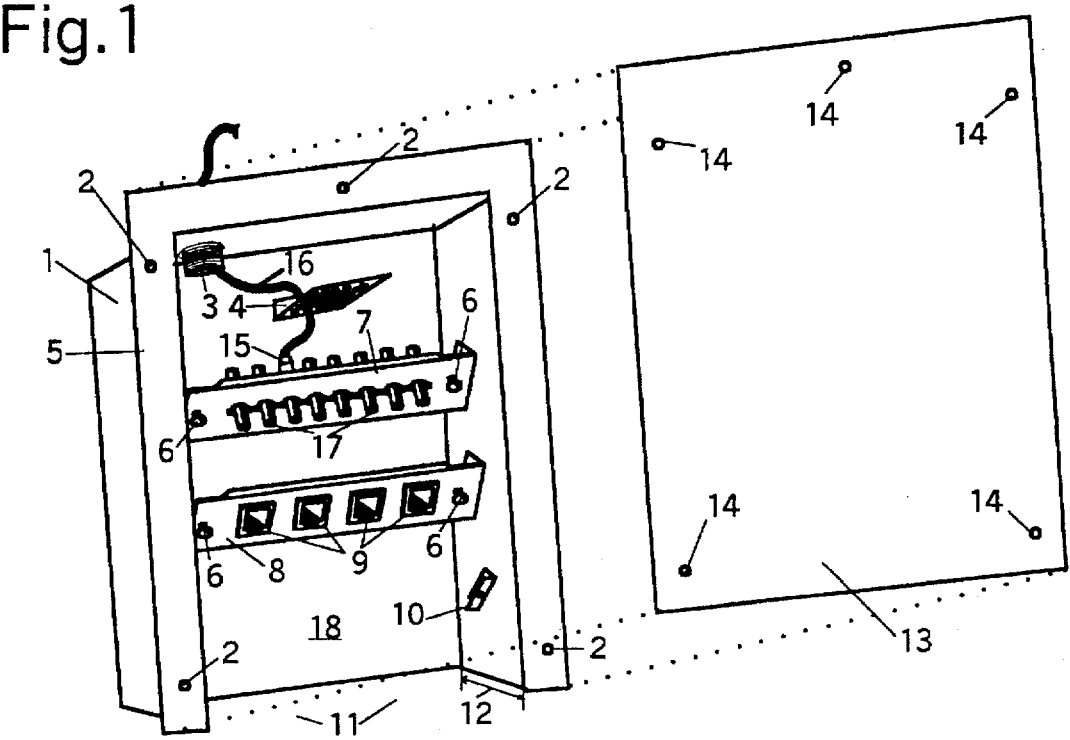
FIG. 1 shows a perspective view of the invention.

FIG. 1 shows a perspective view of the connector box. As can be seen in that figure, the box itself is made up of a body which has a solid back (18) and at least three sides (1), and is open on its face and preferably on one end (11). The sides (1) are shallow enough for the box to fit entirely within a standard wall, with the front of the box flush against the surface of the wall. Since nearly all commercial wall construction is based on the use of 2"×4" studs made of stamped metal or wood (these studs are actually 1½"×3½" finished, in the case of wood), covered with a ½" or so layer of gypsum board or the like, the depth of the sides is preferably no more than about 3".

The lengths of the sides will vary based on the number, type and arrangement of connector panels desired. For a three-panel box designed for Siecor "FDC" series panels (see below), a width of 7½" and a height of 10" would be appropriate.

Surrounding three sides of the open face in the preferred embodiment is a mounting flange (5), which serves to fasten the box to the face of a wall. Alternatively, the box could be mounted to a stud by screws driven through holes in one side (1).

A flush cover (13) can be provided to hide the cabling in the box and protect it from damage, and is fastened to the flange by screws or other fasteners passing through holes (14) in the cover and (2) in the flange. If desired, other fastening arrangements such as magnet strips or mating Velcro® material on the flange and cover plate could be provided.

Inside the box are mounted a number of removable connector panels (7) and (8), which mount to flanges (10) in the sides (1) of the box. The flanges (10) are mounted at an angle to the vertical, which eases the connection of fiber optic or other cables to the connectors on the panels, and minimizes the necessity to bend the fiber optics at a sharp angle against the back of the box (18) or the cover (13). As shown in the drawing, the flanges for the bottom-most connector panel are preferably mounted slightly more horizontally than the others, pointing the connectors on any panel mounted to the flanges toward the open bottom (11) of the box.

The removable connector panels have a number of connectors, such as the fiber optic "barrels" (17) on panel (7), or the modular communications connectors (9) on panel (8), or coaxial connectors, or some mix of these or other connectors. Cabling (16) can be passed into the box through a conduit or other fitting (3) in the top of the box, through a strain-relief (4), and the plug (15) on the end of the cable plugged into the back of one of the connectors (17) on the connector panel (7). The number of connectors on the panel can vary depending on the kind and mix of connectors. Preferably, these connector panels are standardized for width and interchangeable within the box. The connector panels are held to the flanges (10) by fasteners (6), preferably the "pop-in/out" type shown, in which the fastener comprises a knob with a flared end which is pushed into an expanding part to cause the expanding part to expand behind the flange, holding the panel in place. Alternatively, screws or half-twist (Dzuz®) fasteners could be used.

Connector panels such as the "FDC", "HDC" or "WS" series manufactured by Siecor would be especially suitable for use with the invention. An eight-connector fiber panel as shown at (7) would be model FDC-CP8-09, with the numbers differing based upon what connectors are specified on the board. A four-modular panel as shown at (8) would be WS-1AA-1AA-1AA-1AA. Similar panels are available with modular telephone connectors, or with a combination of the two.

A strain-relief panel (4) can be provided, through which the cabling (16) can pass, to prevent damage to the connectors if the cabling is pulled in the plenum outside the box. The strain relief (4) may be a simple flat plate with an array of holes, a clamp of some kind, or some other arrangement as may be convenient.

Figure 2:
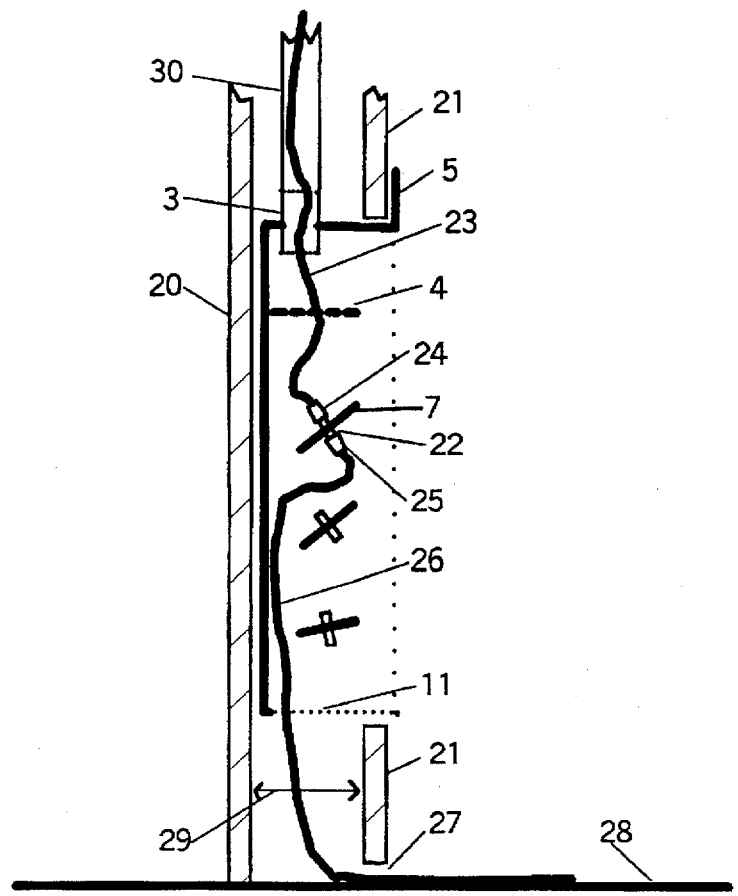
FIG. 2 shows a side cut-away view of a wall with the box of the invention installed.

FIG. 2 shows how the box of the invention works within a wall.

The wall of the example is shown as a free-standing wall made up of two gypsum board (Sheetrock®) panels (20) and (21) spaced apart (29) by the thickness of a stud (3½", typically), with (21) being the side inside the room or cubicle. If this box were being mounted on a framed-out wall around a structural column, then the column would form the inside of the wall, rather than the panel (20).

The flanges (5) surrounding the connector box of the invention are mounted to the surface (21) of the wall, by adhesive, or screws, or any other convenient means. As can be seen in FIG. 2, because the depth of the sides (1) of the box is less than that of the wall (preferably 3" or less), the entire box is invisibly mounted completely below the surface (21) of the wall, with only the flanges and (optional) cover showing.

The cabling, here shown as fiber optic cable (23) descends inside the wall from the ceiling plenum, typically, and enters the box through a conduit (30) and conduit connector (3), and through the strain relief (4). The plug (24) on the cable is plugged into the back of a connector (22) on a connector panel (7). For ease of use, the panel (7) can be popped out while the plug is attached, and then popped back in and fastened in place.

Cables (26) from the network stations can be led along the floor (28), preferably along the base of the modular walls or inside the modular walls (which usually have removable lower moldings for just this purpose), and through a slot (27) or other hole at the base of the wall surface (21). They then pass upward through the open bottom (11) of the box, and the plug (25) on the cable (26) is connected to the appropriate connector (22) on the connector panel (7).

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A connector box for communications cables, for flush mounting within a wall having an outer surface and a depth, comprising:
    a body comprising a back, three closed sides having a depth extending from the back, the depth of the sides being less than the depth of the wall, and an open fourth side, the fourth side being left open for the passage of cables therethrough;
    b) means for mounting the body to the wall, flush with the outer surface of the wall, the body being substantially completely contained within the wall when the body is mounted;
    c) at least one communication cable connector panel, each panel being removably mounted within the body and each panel having a plurality of communications connectors;
    d) each communication cable connector panel being mounted within the body such that neither the at least one connector panel nor the connectors extend beyond the sides of the body.

2. The connector box of claim 1, in which the means for mounting the box comprise a flange extending substantially completely around the sides of the body, perpendicular thereto and extending outwards thereof.

3. The connector box of claim 1, in which the depth of the sides is no more than 3".

4. The connector box of claim 1, in which the at least one connector panel nearest the open fourth side of the body is mounted perpendicular to the back of the body such that the cables attached to the connectors on the at least one panel will pass nearly directly through the open fourth side of the body.

5. The connector box of claim 1, further comprising strain relief means for preventing one of the cables from being pulled out of one of said connectors on the at least one connector panel, mounted to the body.

6. The connector box of claim 5 in which the cables have a characteristic diameter, and the strain relief means comprises a panel, mounted on the back of the body, having a plurality of holes approximating the diameter of the cables, such that the cables are passed through the holes in the strain relief means, preventing said one of the cables from being pulled out of said one of the connectors on the at least one connector panel.

7. The connector box of claim 1, in which the at least one connector panel is mounted at an angle relative to the back of the body and parallel to the open fourth side of the body.

* * * * *